UNITED STATES PATENT OFFICE.

WILLIAM HUMPHREY, OF SHARON, WISCONSIN.

IMPROVEMENT IN COMPOSITIONS FOR ARTIFICIAL MARBLE.

Specification forming part of Letters Patent No. 148,613, dated March 17, 1874; application filed February 12, 1874.

*To all whom it may concern:*

Be it known that I, WILLIAM HUMPHREY, of Sharon, in the county of Walworth in the State of Wisconsin, have invented certain Improvements in Artificial Marble, of which the following is a specification:

The object of my invention is to manufacture a composition for artificial marble, and is made as follows:

I take of sulphate of alumina five pounds, and of chlorate of potassa two ounces, and dissolve the same in a barrel of water, or about that quantity, and when dissolved I mix enough cement with the water to make a paste stiff enough to fill into molds. I then put this composition into molds and let it remain about five hours, and then take it out of the molds; or, to improve upon the compound, I add to the above solution two ounces of chloride of zinc, and to color the composition I use any pigment that may be necessary to give the composition such color as may be desired. After the composition is taken out of the molds I rub it down with stone, to bring out the veins and make it smooth.

I claim as my invention—

An artificial marble, composed of sulphate of alumina, chlorate of potassa, water, and cement, in about the proportions described.

WILLIAM HUMPHREY.

Witnesses:
 J. B. SMITH,
 E. J. SMITH.